(12) United States Patent
Reddy et al.

(10) Patent No.: US 8,920,239 B2
(45) Date of Patent: *Dec. 30, 2014

(54) GAMING MACHINE HAVING INTERCHANGEABLE DISPLAY CONTENT

(71) Applicant: Bally Gaming, Inc., Las Vegas, NV (US)

(72) Inventors: Mettu R. Reddy, Marshfield, WI (US); Joshua D. Larsen, Las Vegas, NV (US); Pravinkumar Patel, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,506

(22) Filed: Aug. 19, 2013

(65) Prior Publication Data

US 2013/0344955 A1 Dec. 26, 2013

Related U.S. Application Data

(63) Continuation of application No. 12/103,659, filed on Apr. 15, 2008, now Pat. No. 8,517,829.

(60) Provisional application No. 61/019,824, filed on Jan. 8, 2008.

(51) Int. Cl.
*A63F 9/24* (2006.01)
*A63F 13/00* (2014.01)
*G07F 17/32* (2006.01)

(52) U.S. Cl.
CPC ............ *A63F 13/00* (2013.01); *G07F 17/3244* (2013.01); *G07F 17/3211* (2013.01); *G07F 17/3239* (2013.01)
USPC .................... 463/31; 463/20; 463/36; 463/46

(58) Field of Classification Search
USPC ................................................ 463/29, 31, 37
See application file for complete search history.

(56) References Cited

U.S. PATENT DOCUMENTS

| | | | |
|---|---|---|---|
| 4,665,438 A | 5/1987 | Miron et al. | |
| 4,959,719 A | 9/1990 | Strubbe et al. | |
| 5,091,866 A | 2/1992 | Takagi | |
| 5,432,561 A | 7/1995 | Strubbe | |
| 5,453,796 A | 9/1995 | Duffield et al. | |
| 5,497,454 A | 3/1996 | Bates et al. | |
| 5,612,715 A | 3/1997 | Karaki et al. | |
| 5,999,176 A | 12/1999 | Kamper | |
| 6,243,645 B1 | 6/2001 | Moteki et al. | |
| 6,573,913 B1 | 6/2003 | Butler et al. | |
| 6,652,378 B2 | 11/2003 | Cannon et al. | |
| 6,656,040 B1 | 12/2003 | Brosnan et al. | |
| 6,717,556 B2 | 4/2004 | Asahi et al. | |
| 6,860,810 B2 | 3/2005 | Cannon et al. | |
| 7,477,321 B2 | 1/2009 | Yokoyama et al. | |
| 7,627,518 B1 | 12/2009 | West | |
| 7,690,979 B2 | 4/2010 | Ogiwara | |
| 7,777,691 B1 | 8/2010 | Nimmer et al. | |
| 8,403,740 B2 | 3/2013 | Kovacs et al. | |

(Continued)

*Primary Examiner* — Steven J Hylinski

(74) *Attorney, Agent, or Firm* — Brooke Quist; Marvin Hein

(57) ABSTRACT

Various embodiments disclosed herein are directed to methods, gaming machines, and gaming systems with multiple displays having interchangeable display content. According to one embodiment, a gaming machine includes a first display for presenting a primary game, a second display for presenting secondary display content to a player, and a player input device for receiving player input to configure content displayed on the first display and the second display such that the first display presents the secondary display content and the second display presents the primary game.

19 Claims, 7 Drawing Sheets

(56) References Cited

U.S. PATENT DOCUMENTS

| | | |
|---|---|---|
| 8,414,371 B2 | 4/2013 | Tempest et al. |
| 8,414,372 B2 | 4/2013 | Cannon et al. |
| 2002/0151360 A1 | 10/2002 | Durham et al. |
| 2004/0106446 A1 | 6/2004 | Cannon et al. |
| 2004/0137978 A1 | 7/2004 | Cole et al. |
| 2006/0178186 A1 | 8/2006 | Lind |
| 2006/0211494 A1 | 9/2006 | Helfer |
| 2008/0153566 A1 | 6/2008 | Kovacic et al. |
| 2008/0167106 A1 | 7/2008 | Lutnick et al. |
| 2008/0171602 A1 | 7/2008 | Patel et al. |
| 2008/0254881 A1 | 10/2008 | Lutnick et al. |
| 2010/0048285 A1 | 2/2010 | Graf et al. |

GAMING MACHINE HAVING INTERCHANGEABLE DISPLAY CONTENT

CROSS-REFERENCE TO RELATED APPLICATIONS

This application is a continuation of U.S. patent application Ser. No. 12/103,659, filed Apr. 15, 2008, entitled "Gaming Machine Having Interchangeable Display Content and Methods," which claims the benefit of U.S. Patent Application No. 61/019,824, entitled "Video Switcher and Touch Router Device for a Gaming Machine," filed on Jan. 8, 2008, both of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Gaming machines have been developed that have various features designed to capture and maintain player interest. Traditionally, gaming machines garner player interest by providing the player with the opportunity to win cash awards based upon the player's wager. Accordingly, various types of games and game features have been developed to provide players with the opportunity to win large sums of money for a small wager. For example, games may include one or more bonus games or the opportunity to win progressive jackpots in order to maintain player interest.

Additionally, over the years, gaming machines have grown in both sophistication and the types of gaming features used to maintain a player's interest. For example, the mechanical reels of traditional gaming machines have been replaced with video depictions of spinning reels. These video gaming machines may provide a richer gaming experience for players by including graphics or animation as part of the game. While current gaming machines are successful, there is a continuing need for slot machine variants that provide a player with enhanced excitement and ease of use.

SUMMARY

Briefly, and in general terms, various embodiments are directed to gaming machines having interchangeable display content. The ability to switch display content gives a player the ability to more easily interact with display content that is not typically presented on the primary display of the gaming machine.

In one embodiment, a gaming machine is disclosed having interchangeable display content. The gaming machine includes a first display that is reconfigurable to present a game content; a second display that is reconfigurable to present a secondary display content to a player, wherein the first and second displays are reconfigurable to swap the game content and the secondary display content at the same time in a single step; and a player input device for receiving player input to swap the content displayed on the first display and the second display such that the first display presents the secondary display content and the second display presents the game content. In one aspect, an option is provided to the player subsequent to initiation of game play to save content as swapped or return to a default mode where the first display presents the game content and the second display presents the secondary display content.

In another embodiment, the disclosed gaming system includes at least one gaming machine. The gaming system includes: a first display that is reconfigurable to present a primary game on the gaming machine, a wireless receiver, and a game processor in communication with the first display and the display content of the wireless peripheral device. The wireless receiver is associated with the gaming machine for receiving data transmitted from a wireless peripheral device having a display for presenting content. The display content of the first display of the gaming machine is swappable with the display content of the wireless peripheral device at the same time in a single step. This enables the first display of the gaming machine to present the display content of the wireless peripheral device, and the display of the wireless peripheral device to present the display content of the first display of the gaming machine. The game processor causes the first display to present the display content of the wireless peripheral device and the display of the wireless peripheral device to present the primary game in response to a trigger event based on player performance, a game outcome, a non-gaming transaction, or a game-generated response. In one aspect, an option is provided to the player subsequent to initiation of game play to save content as swapped or return to a default mode where the first display presents the primary game content and the second display presents the secondary display content.

In still another embodiment, a method is disclosed for altering display content on a gaming machine. The method includes: providing a first display on the gaming machine that is reconfigurable to present a primary game; providing a second display on the gaming machine that is reconfigurable to present a secondary game; and automatically swapping display content on the first display with display content on the second display at the same time in a single step in response to a trigger event based on a game outcome of a game of chance, or a game-initiated response; wherein an option is provided to the player subsequent to initiation of game play to save content as swapped or return to a default mode where the first display presents the primary game content, and the second display presents the secondary display content.

In yet another embodiment, a method is disclosed for altering display content on a gaming machine having a first display and a second display. The method includes: initiating a game on the first display of the gaming machine; initiating secondary display content on the second display of the gaming machine; receiving player input to swap first display content on the first display with secondary display content on the second display; swapping secondary display content on the first display and first display content on the second display at the same time in a single step; and receiving data transmitted from a wireless peripheral device having a display for presenting content, wherein display content of the first or second display of the gaming machine is swappable with the display content of the wireless peripheral device; wherein an option is provided to the player subsequent to initiation of game play to save content as swapped or return to a default mode where the first display presents the primary game content, and the second display presents the secondary display content.

In addition to gaming machines, various methods for managing gaming machines providing interchangeable display content are disclosed herein. According to one method, a game is initiated on the first display of the gaming machine.

The display content is automatically swapped with the display content from a second display in response to a trigger event.

In another method, a game is initiated on the first display of the gaming machine. The player is presented with an option to swap first display content shown on the first display with secondary display content shown on the second display in response to a trigger event. Upon receiving player input, the first display content is swapped with the secondary display content. Accordingly, the secondary display content is presented on the first display and the first display content is presented on the second display.

In yet another method, the gaming machine receives player input to configure the display content of the first display and/or the second display. A gaming session is initiated in response to a player wager. The gaming machine receives player input that configures the display and/or display content. The player's configurations are saved as a default configuration for future gaming sessions.

Other features and advantages will become apparent from the following detailed description, taken in conjunction with the accompanying drawings, which illustrate by way of example, the features of the various embodiments.

DETAILED DESCRIPTION

Various embodiments are directed to gaming machines having interchangeable displays. According to one embodiment, the content normally presented on a top box display is presented on the first display of a gaming machine in response to a trigger event, and the content normally displayed on the first display of the gaming machine is presented on the top box display. In an alternate embodiment, the gaming machine includes an input device that allows a player to exchange the display content between the first display and the top box display. The ability to switch displays gives a player the ability to more easily interact with the content that is typically presented on the top box display.

Figures 1, 2:
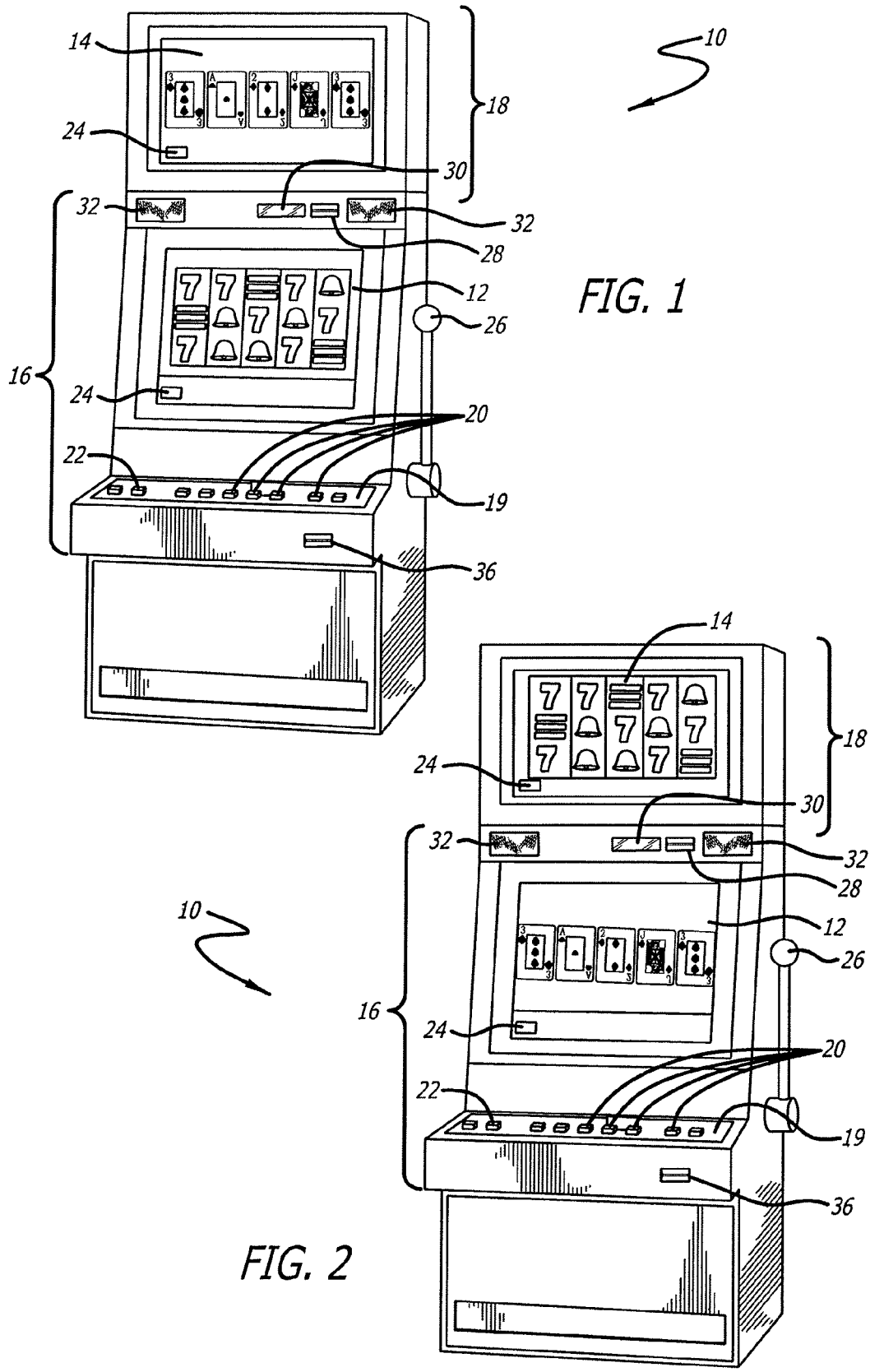
FIG. 1 is a perspective view of one embodiment of a gaming machine having displays that interchange display content.
FIG. 2 is a perspective view of the gaming machine of FIG. 1 with the display content interchanged.

Referring now to the drawings, wherein like reference numerals denote like or corresponding parts throughout the drawings and, more particularly to FIGS. 1-4, there are shown various embodiments of a gaming machine having interchangeable displays. More specifically, as shown in FIG. 1, the gaming machine 10 includes a primary display 12 and a secondary display 14. The primary display 12 is generally positioned in the main cabinet 16 of the gaming machine 10, and the secondary display 14 is positioned above the primary display 12 in a top box 18. Alternatively, the secondary display 14 is located anywhere within the main cabinet 16 of the gaming machine 10. Generally, the primary display 12 is positioned within the main cabinet 16 such that the primary display is approximately at the player's eye level when the player is seated at the gaming machine 10.

The primary display 12 and the secondary display 14 are generally video displays. In one embodiment, the primary display 12 and/or the secondary display 14 are flat panel displays including by way of example only, and not by way of limitation, liquid crystal, plasma, electroluminescent, vacuum fluorescent, field emission, LCOS (liquid crystal on silicon), and SXRD (Silicon Xtal Reflective display), Laser, or any other type of panel display known or developed in the art. These flat panel displays may use panel technologies to provide digital quality images including by way of example only, and not by way of limitation, EDTV, HDTV, or DLP (Digital Light Processing). In another embodiment, the flat panel displays are widescreen displays that are mounted in the gaming cabinet in a portrait or landscape orientation. In other embodiments, the primary display 12 and/or the secondary display 14 are cathode ray tube monitors or projection monitor displays.

As shown in FIG. 1, the secondary display 14 is approximately the same size as the main display 12. In other embodiments, the secondary display (not shown) may be larger or smaller than the main display 12. In one embodiment, the secondary display (not shown) is a smaller display that is adjacent to the main display 12. In yet another embodiment, the secondary display (not shown) is positioned above the main display 12.

FIG. 1 illustrates a gaming machine 10 having a player interface consisting of a plurality of player-activated buttons 20. In one embodiment, a button 22 on the player interface allows a player to swap (i.e., change the display content of the main and secondary displays 12, 14). In another embodiment, the button (not shown) is provided or associated with a player tracking display (not shown) or other displays on the gaming machine that allows the player to sway display content. The button 22 may be a toggle switch, a rocker switch, a rotary dial switch, or any other suitable physical input device.

In the embodiment shown in FIG. 1, the gaming machine 10 includes a virtual button 24 provided on the primary and/or secondary display that allows the player to sway display content of the main and secondary displays 12, 14. In yet another embodiment, the virtual button (not shown) is presented on any other display on the gaming machine (e.g., player tracking display or a tertiary display). In either embodiment, the virtual button employs a touch-screen or touch-glass technology. Accordingly, the player may touch particular locations on the screen or the touch glass (i.e., those locations represented by a video-depiction of a button) to activate a function such as, but not limited to, swapping display content. Alternatively, the touch screen system is a supplement to the electromechanical buttons 20 provided on the gaming machine 10.

The other player-activated buttons 20 provided on the player interface of the gaming machine 10 may be used for various functions such as, but not limited to, selecting a wager denomination, selecting a number of games to be played, selecting the wager amount per game, initiating a game, or cashing out money from the gaming machine 10. The buttons 20 function as input mechanisms and may include mechanical buttons, electromechanical buttons, touch screen buttons. According to one embodiment, the buttons 20 are backlit to indicate whether the button is active. In another embodiment, one input mechanism is a universal button module that provides a dynamic button system adaptable for use with various games, as disclosed in U.S. application Ser. No. 11/106,212, entitled "Universal Button Module," filed Apr. 14, 2005 and U.S. application Ser. No. 11/223,364, entitled "Universal Button Module," filed Sep. 9, 2005, which are both hereby incorporated herein by reference. Additionally, other input devices, such as but not limited to: a touch pad, a track ball, a mouse, switches, or toggle switches, are included with the gaming machine to also accept player input. Optionally, a handle 26 may be "pulled" by a player to initiate a slots-based game.

In yet another embodiment, a cellular phone or other input device (e.g., PDA), separate and apart, from the gaming machine 10 may also be used to input various player choices and information to enhance the player's interactive experience with the gaming machine. In this embodiment, the gaming machine 10 also includes a IR sensor, an RF sensor, a BLUETOOTH receiver, or other means for receiving input from a cellular phone or other wireless input devices. Furthermore, inputting information via these devices provides an added level of security as any key presses may be hidden from view. In yet another embodiment, a player may call or send a text message or a short message service (SMS) to the gaming machine. Optionally, the display content presented on a peripheral device may be displayed on one or more of the displays 12, 14 on the gaming machine. Additionally, the display content from one or more of the displays 12, 14 on the gaming machine 10 may be displayed on the display screen of the peripheral device. The swapping of the display content between the gaming machine and the peripheral device may be player-initiated, gaming machine initiated, or system-initiated event.

In a default mode, a primary or main game is presented on the primary display 12, and the secondary display 14 presents a secondary game such as, but not limited to a bonus game, a bonus round, or an entirely different game from the main game. For example, as shown in FIG. 1, the primary display 12 presents a slots-style game and the secondary display 14 presents a poker game. In an alternate embodiment, the games presented on the primary or secondary displays 12 and 14 include, but not limited to, video slots, video keno, video poker, video blackjack, video roulette, Class II bingo, games of skill, games of chance involving some player skill, or any combination thereof.

In an alternative embodiment, the secondary display 14 presents game-related information such as, but not limited to, a paytable or one or more game options to the player. Alternately, the secondary display 14 presents non-game related information such as, but not limited to, advertisements, news, information on sports betting, betting options for those sporting events, requests for drinks or food, concierge services, or promotional information (e.g., information relating to player's club).

In one embodiment, the player is able to swap the display content of one or more displays 12, 14 via one or more player-activated buttons 22, 24. According to one embodiment, a player-activated button 22, is actuatable during certain periods of time. For example, the button 22 is only activated when the primary or secondary games are idle (e.g., after the game is completed or before the games are initiated). In those gaming machines having touch screen buttons 24, the touch screen button only appears or is actuatable at those times in which the player may interchange display content (e.g., idle periods, after a predetermined message is presented on a display, or in response to other player input). In another embodiment, the player-activated button 22, 24 for interchanging display content is always active, thereby allowing the player to swap display content at any time during the gaming session.

According to another embodiment, the content displayed on the primary and secondary displays 12, 14 are interchangeable in response to a trigger event. The triggering event is a condition that needs to be satisfied in order to swap displays or activate a display swap button 22, 24. In one embodiment, the trigger event is a predetermined game outcome that triggers a secondary game such as, but not limited to, a particular game indicia, combination of game indicia, game score, or any other game outcome including both winning and losing game outcomes. For example, the triggering event may be a symbol combination of "cherry-cherry-cherry" for a slots-type game. In a poker game, the triggering event may be a pair of jacks or better. In other embodiments, the triggering event may be any winning outcome having a low or high probability. In those embodiments where a gaming machine presents both a primary game and a secondary game, the triggering event may be an outcome in either the primary or the secondary game.

In another embodiment, the triggering event is a game-generated or system-generated response such as, but not limited to, a message from another networked gaming machine or a message from a system host. For example, the message is a tournament-initiating message (e.g., a tournament is starting or a player is eligible to play in the tournament) or a system-initiated bonus game message (e.g., a bonus game is starting or a player is eligible for the bonus game).

Alternatively, triggering events may be based upon player activity/actions. For example, the triggering event may be based upon player performance such as, but not limited to, inserting a player tracking card into the gaming machine, time of play, frequency of play (i.e., number of games played in a particular period of time), number of maximum bets, number of player points earned, or a combination thereof.

In yet another embodiment, the triggering event is a player-initiated event or transaction. For example, the trigger event is a player request to order a drink, food, merchandise, or services. When the player desires to order a drink, the message that is normally presented on the secondary display (or other display that is not the main display) is automatically presented on the main display of the gaming machine. Accordingly, the player may select their drink and send in their request. Once the transaction is completed, the main display and the secondary display present their respective display content.

Interchanging the displays allows the content presented on the secondary display 14 to be more easily accessed by the player when presented on the primary display 12. For example, as shown in FIG. 2, the poker game is presented on the primary display 12 and the slots-style game is presented on the secondary display 14. At the conclusion of the poker game, the primary and secondary displays 12, 14 revert back to the default displays. Additionally, interchanging display content simplifies a gaming device thereby reducing manufacturing costs. For example, a gaming machine having multiple displays only needs one touch screen interface on the main display since the gaming machine may interchange display content from the multiple displays onto the main display having the touch screen interface.

Figure 3:
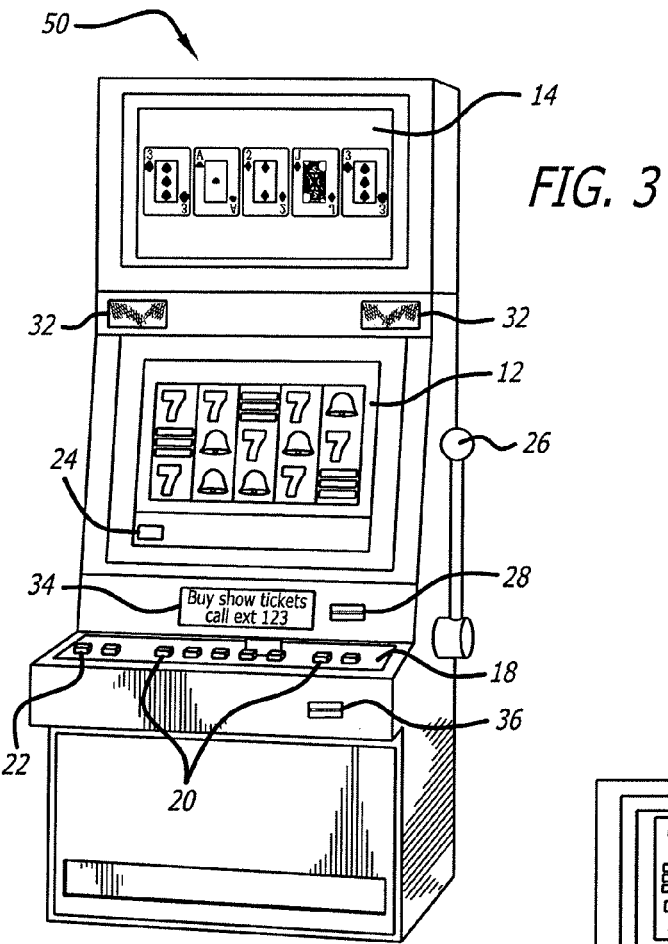
FIG. 3 is a perspective view of another embodiment of a gaming machine having displays that interchange display content.
Figure 4:
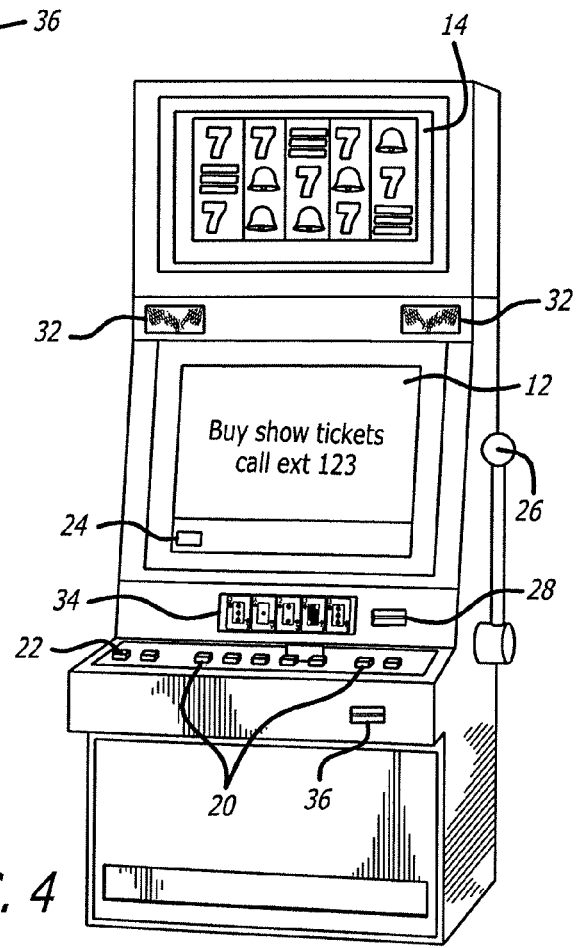
FIG. 4 is a perspective view of the gaming machine of FIG. 3 with the display content interchanged.

As shown in FIGS. 3-4, the gaming machine 50 also includes a third display 34 positioned between the primary display 12 and the secondary display 14. As those skilled in the art will appreciate, the third display 34 may be positioned below the main display 12, adjacent to the main or secondary display 14, on the player interface 19, or any location on the gaming machine within the line-of-sight of a player. As shown in FIG. 3, a slots-style game is presented on the main display 12, a poker game is presented on the secondary display, and a non-game related message is presented on the third display 34. FIG. 4 illustrates one embodiment where the display content of the displays 12, 14, 34 are interchanged. In the depicted embodiment, the non-game related message is presented on the main display 12, the slots-style game is presented on the secondary display 14, and the poker game is presented on the third display 34. As those skilled in the art will appreciate, other permutations of display content are contemplated (e.g., a poker game on main display 12, non-game information on secondary display 14, and a slots game on the third display 34).

According to one embodiment, the third display 34 is a graphical interface, which is the subject of U.S. patent application Ser. No. 10/943,771, filed Sep. 16, 2004, which is hereby incorporated herein by reference. The graphical interface includes a web content capable display screen and an embedded processor. Preferably, the web content capable display screen presents web information to a user via the display screen. The embedded processor preferably utilizes an internal operating system and communicates with the gaming processor of the gaming machine. Preferably, the embedded processor reads incoming data, translates the data into a web protocol (web authoring language), if necessary, and maps the data to the web content capable display screen. In this manner, the web content capable display screen increases user excitement by providing a richer gaming experience. Furthermore, the display allows the player to play a secondary game, input information, make selections, receive promotional information or other types of information including, but not limited to, notification that the player has won a system award, is entered into a tournament game or other bonus game. Additionally, the player is able to configure the attributes of interchanging display content via the graphical interface.

According to one embodiment, the characteristics of interchanging of display content are configured at the gaming machine. Alternatively, the gaming machine is remotely configured through a network connection to a backend terminal. In these various embodiments, the characteristics may be established by the player, gaming machine manufacturer, or gaming establishment. The characteristics include enabling/disabling a manual swap of display content, enabling/disabling a player interface button, enabling/disabling a touch screen button, enabling/disabling an automatic swap of display content, enabling/disabling restoration to default mode upon game idle, establishing game idle duration before the displays return to default mode, enabling/disabling restoration to default mode upon device idle, or setting idle duration before the displays return to default mode. Another characteristic that may be established is the order of display sway (i.e., each activation of a player-actuated button causes content to change between different displays). For example, actuation of the swap button causes the first display and the second display to switch content. Alternatively, actuation of the swap button causes the content of the second display and the third display to switch, and a subsequent actuation of the swap button causes the display content to switch between the first and third displays.

Referring back to FIG. 1, the gaming machine 10 includes a player tracking system. The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a slot 28 for receiving a player tracking card, a keypad or equivalent, an electronic button receptor, a display 30, a touch screen, or the like. The player tracking system may also include a database of all qualified players (i.e., those players who have enrolled in a player rating or point accruing program). Generally, the database for the player tracking system is separate from the gaming machines.

In one embodiment, player information is used to configure the interchange of display content. For example, player characteristics such as, but not limited to, height may be stored in the player tracking system database. Accordingly, short-stature players may have the second display content presented on the primary display in response to a trigger event, whereas the display content may not be switched for a taller player. Additionally, the gaming machine may adjust the font of the text provided upon the gaming machine based upon information stored in the player tracking system database. For example, the font is enlarged for players that are near-sighted players.

In another embodiment, the gaming machine 10 may include a biometric system (not shown). The biometric system obtains biometric information from a player (e.g., height or near-sightedness by detecting whether a patron is wearing glasses). Based upon the biometric information, the gaming machine swaps the display content of the various displays in response to a trigger event. Using the previous example, the gaming machine determines that a shorter player is playing the game, and the gaming machine swaps the display content in response to a trigger event. Alternatively, if the gaming machine determines that a taller player (or a player is standing), the gaming machine does not swap display content.

As shown in FIG. 1, the gaming machine 10 includes a top box 18 and a main cabinet 16. According to one embodiment, the top box 18 is a separate and distinct component that is affixed to the main cabinet 16. In another embodiment, the top box 18 is an area that is partitioned from the main cabinet 16. Alternatively, the top box 18 and the main cabinet 16 may be contiguous areas with the outward appearance of two distinct components. The top box 18 includes a secondary display 14 for displaying game information (e.g., name of the game, animation, one or more pay tables, game information, one or more help menus, progressive jackpot or game information, tournament game information, or any combination thereof) or non-game related information (e.g., news, advertisements, messages, promotions, or any combination thereof). In one embodiment, the secondary display 14 presents a secondary game such as, but not limited to, a bonus game, a progressive game, or a continuation game of the base game. In yet another embodiment, the top box 18 also includes a display glass (not shown) that includes the name of the game, artwork, game instructions, pay table, or other information relating to one or more games presented on the gaming machine 10.

The main cabinet 16 of the gaming machine 10 is a self-standing unit that is generally rectangular in shape. In another embodiment, the main cabinet is a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine is a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated herein by reference.

The main cabinet 16 of the gaming machine also houses a game management unit (not shown) that includes a CPU, circuitry, and software for receiving signals from the player-activated buttons 20 and a handle 26, operating the games, and transmitting signals to the respective game display 12, 14 and speakers 32.

In various embodiments, the game program may be stored in a memory (not shown) comprising a read-only memory (ROM), volatile or non-volatile random access memory (RAM), a hard drive or flash memory device or any of several alternative types of single or multiple memory devices or structures.

As shown in FIG. 1, the gaming machine 10 includes a ticket reader/ticket printer slot 36 that is associated with a cashless gaming system (not shown). According to one embodiment, the slot 36 is used for the ticket reader and ticket printer. Accordingly, the same slot 36 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher.

In another embodiment, the gaming machines 10, 50 include an internet connection or other known network connections to link one or more gaming machines together. According to one embodiment, the internet connection is used for web browsing, prize redemption, or access to other gaming or non-gaming information. Additionally, with the various gaming machines in communication with one another (or a system host), the gaming machines 10, 20 may participate in a gaming tournament. In one embodiment, the gaming tournament is a competitive gaming tournament having one or more winners. Alternatively, the gaming tournament is a cooperative gaming tournament where all eligible gaming machines win a particular award.

Figures 5A, 5B:
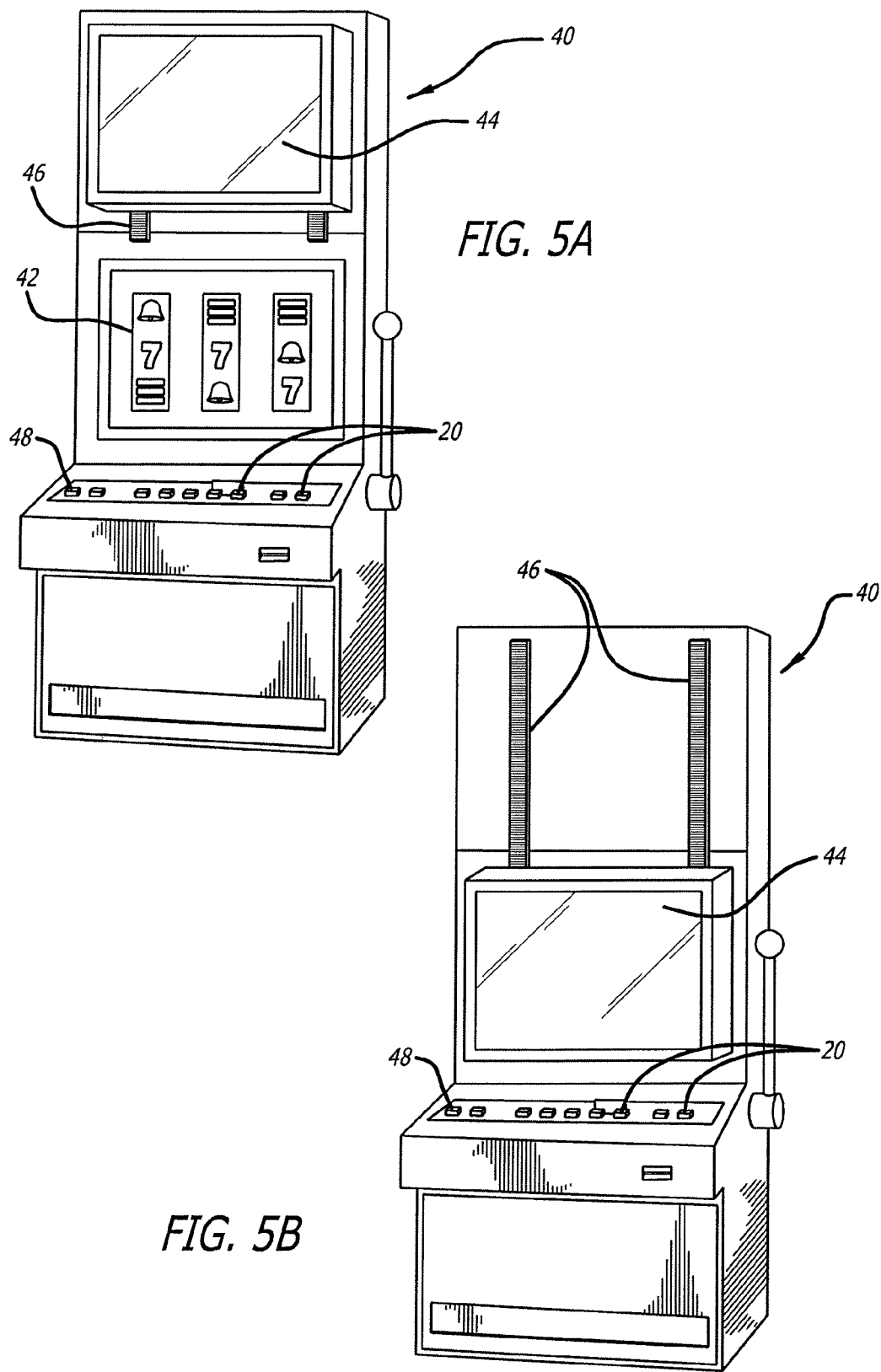
FIG. 5A is a perspective view of one embodiment of a gaming machine having a moveable secondary display.
FIG. 5B is a perspective view of the gaming machine of FIG. 5A with the secondary display in a lowered position.

FIGS. 5A-5B illustrate one embodiment of a gaming machine 40 having a moveable secondary display 44. As shown in FIG. 5A, the gaming machine 40 includes a plurality of mechanical reels 42 used to present a slots game. In an alternate embodiment, a video display screen (not shown) is used to present a slots-style game to the player. The secondary display 44 is moveably mounted to a track 46. Accordingly, the secondary display 44 is able to move down the track 46 to a position over the mechanical reels 42 in response to a trigger event or player input via a button 48. The secondary display screen will return to the default position (at the top of the gaming machine) at the completion of the display presentation (e.g., completion of a secondary game) or in response to player input via a button 48.

A motor 20 or other drive mechanism known or developed in the art is used in conjunction with a force transmission means to move the secondary display 44. As shown in FIGS. 5A-5B, the force transmission means includes a track 46 or other guiding member that may be used to move the secondary display 44 in a vertical direction. In one embodiment, a rack and pinion system is coupled to the motor 20 to move the secondary display 44. In other embodiments, the drive mechanism is coupled to a belt and pulley system, helical gears, bevel gears, work gears, a four-bar linkage system, a six-bar chain, extendable struts, a scissor lift, a boom lift, or other mechanisms know or developed in the art. In yet another embodiment, a linear actuator (e.g., screw and motor) may be used to raise and lower the secondary display 44. The linear actuator is capable of lifting secondary displays of different weights and at different speeds.

Optionally, the gaming machine 40 includes one or more motion sensors (not shown) or pinch sensors (not shown) to stop the movement of the secondary display 44 if an obstruction is in the path of the display. In various embodiments, the sensors may be infrared, optical or radiofrequency sensors. Of course, any type of sensor may be used herein. Additionally, the sensors may be used to stop the movement of the secondary display 44 when the secondary display has achieved its final stopping position as shown in FIG. 5B.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

Figure 6:
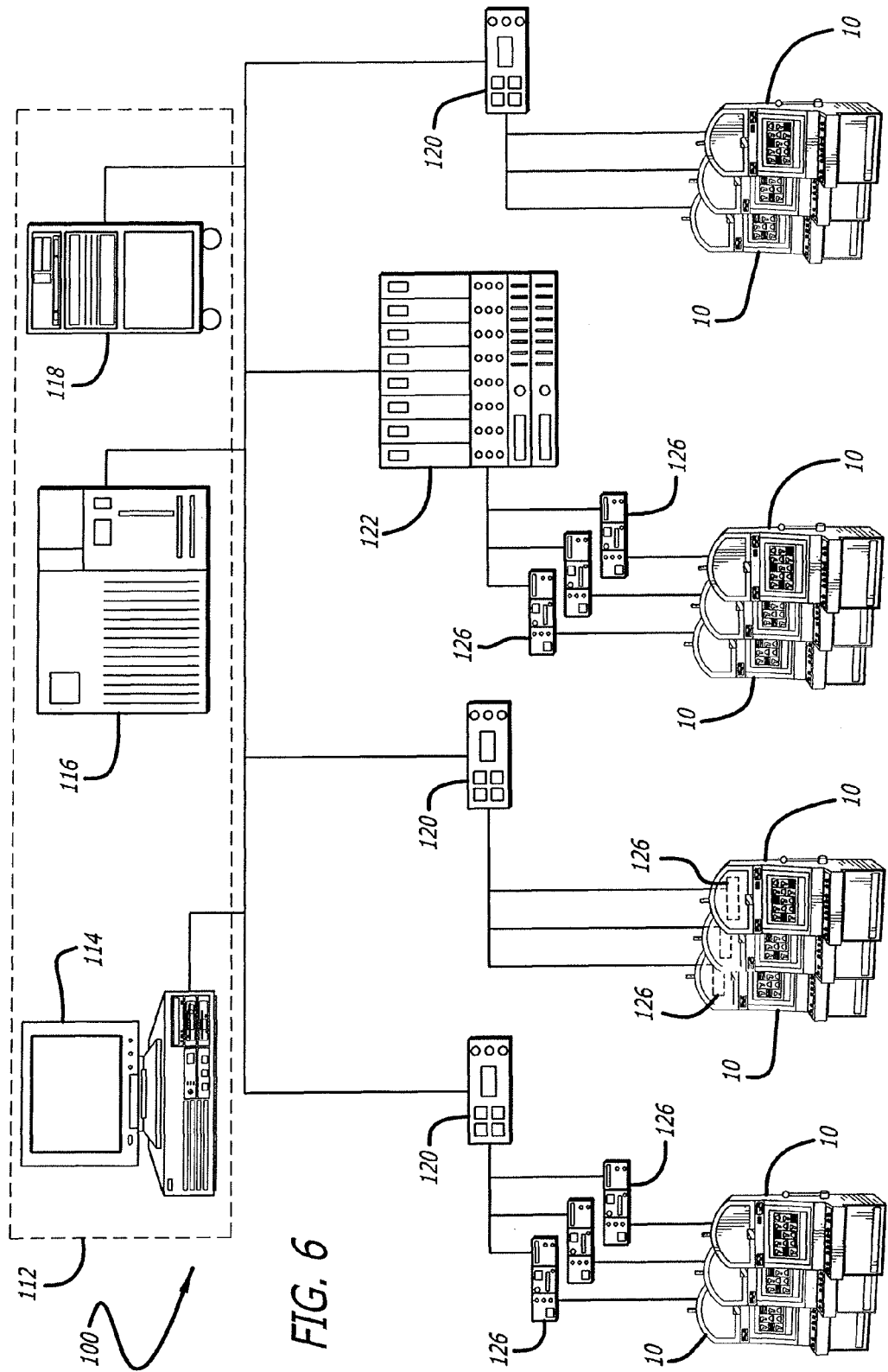
FIG. 6 is a diagram of one embodiment of a gaming system including gaming machines having interchangeable displays.

Referring now to FIG. 6, a casino gaming system 100 is illustrated. The casino gaming system 100 comprises one or more gaming machines 10. In various embodiments, any of the gaming machines 10 may be any type of electronic or mechanical gaming devices, such as, but not limited to, a mechanical reel spinning slot machine, a video slot machine, a video poker machine, a keno machine, a video blackjack machine, or a gaming machine offering one or more of the above-described games. Examples include, but are not limited to, the S6000 mechanical reel spinner and the Alpha video slot machine from Bally Gaming, Inc. The gaming machines 10, 20 illustrated in FIG. 6 act as terminals for interacting with a player playing a casino game. Networking components facilitate communications between the system server 112 and game management units 126 that control displays for carousels of gaming machines 10 across a network. Game management units (GMU's) 126 connect gaming machines to networking components and may be installed in the gaming machine cabinet or external to the gaming machine 10. The function of the GMU 126 is similar to the function of a network interface card connected to a desktop personal computer (PC). Some GMU's 126 have much greater capability and can perform such tasks as presenting and playing a game using a display (not shown) operatively connected to the GMU 126. In one embodiment, the GMU 126 is a separate component located outside the gaming machine 10. Alternatively, in another embodiment, the GMU 126 is located within the gaming machine 10. Optionally, in an alternative embodiment, one or more gaming machines 10 connect directly to a network and are not connected to a GMU 126.

Furthermore, one or more of the gaming machines 10 includes one or more data repositories for storing data. Examples of information stored by the gaming machines 10 include, but are not limited to, accounting data, maintenance history information, short and/or long-term play data, real-time play data, and sound data. In one embodiment, the data repository also stores display content configurations for various games and gaming machines. For example, default and alternate display content configurations for an electronic gaming machine having three displays is stored within the data repository.

The gaming machines 10 are connected via a network to a network bridge 120, which is used for networking, routing and polling gaming machines, including slot machines. The network bridge 120 connects to a back-end system 112. Optionally, the gaming machines 10 may connect to the network via a network rack 122, which provides for a few number of connections to the back-end system 112. Both network bridge 120 and network rack 122 may be classified as middleware and facilitate communications between the back end system 112 and the game management units 126. The network bridges 120 and network rack 122 may comprise data repositories for storing network performance data. Such performance data may be based on network traffic and other network-related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back-end system 112 may be configured to comprise one or more servers. The type of server employed is generally determined by the platform and software requirements of the gaming system. In one embodiment, as illustrated in FIG. 6, the back-end system 112 is configured to include three servers: a slot floor controller 114, a casino management server 116 and a casino database 118. The slot floor controller 114 is a part of the player tracking system for gathering accounting, security and player-specific information. The casino management server 116 and casino database 118 work together to store and process information specific to both employees and players. Player-specific information includes, but is not limited to, passwords, biometric identification, player card identification, and biographic data. Additionally, employee-specification information may include biographic data, biometric information, job level and rank, passwords, authorization codes and security clearance levels.

Overall, the back-end system 112 performs several fundamental functions. For example, the back-end system 112 can collect data from the slot floor as communicated to it from other network components, and maintain the collected data in its database. The back-end system 112 may use slot floor data to generate a report used in casino operation functions. Examples of such reports include, but are not limited to, accounting reports, security reports, and usage reports. The back-end system 112 may also pass data to another server for other functions. Alternatively, the back-end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming machine accounting data, cashable ticket data, sound data, and optimal display configurations for one or more displays for one or more system games.

Of course, one will appreciate that a gaming system 100 may also comprise other types of components, and the above illustrations are meant only as examples and not as limitations to the types of components or games used in a casino gaming system having a display capable of interchanging display content.

Figure 7A:
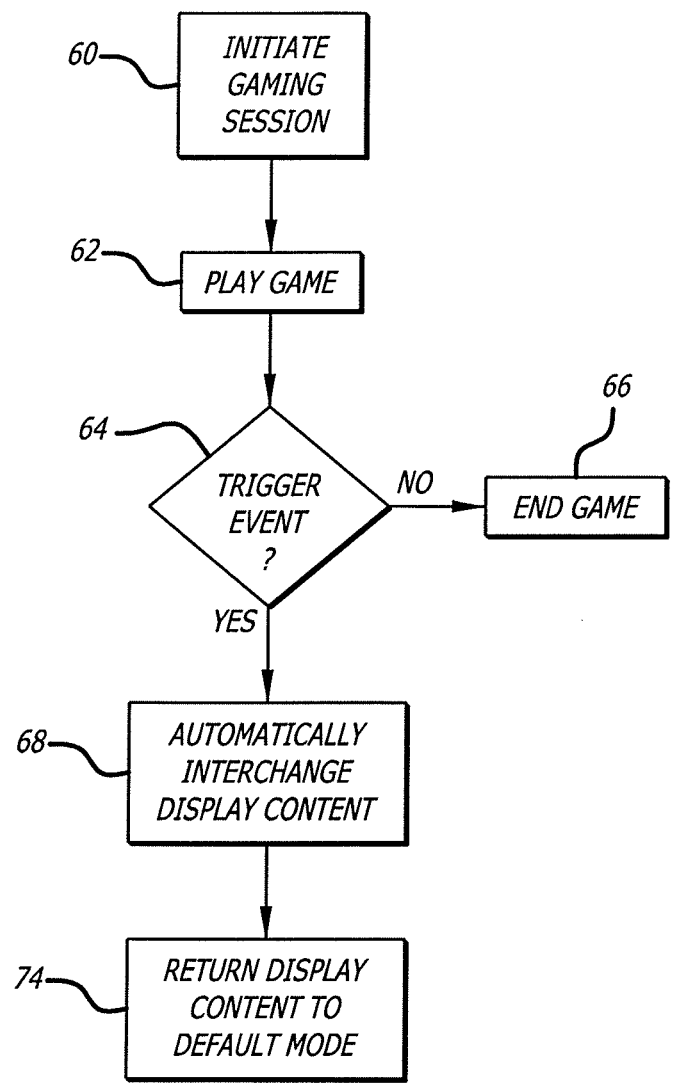
FIG. 7A is a flow diagram of one method for managing gaming machines having interchangeable displays.
Figure 7B:
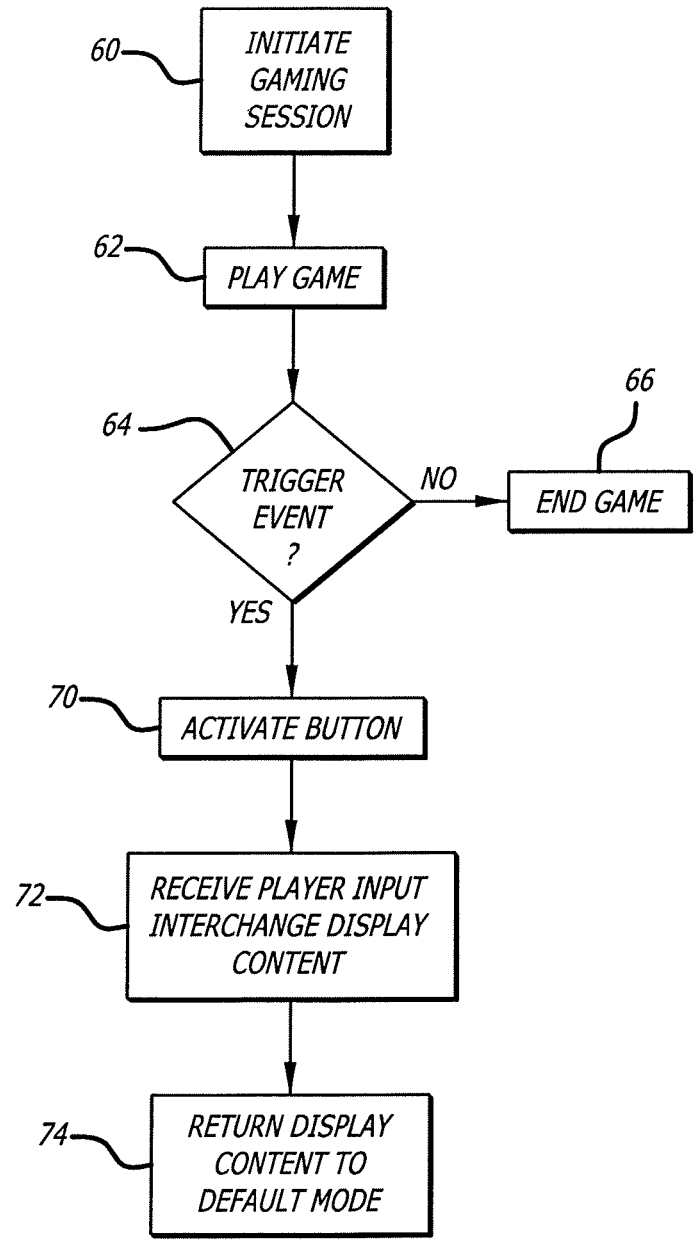
FIG. 7B is a flow diagram of another method for managing gaming machines having interchangeable displays.

In addition to gaming machines and gaming systems, various methods for managing gaming machines having interchangeable display content are disclosed herein. According to one method shown in FIGS. 7A-7B, at step 60, a player initiates a gaming session by inserting monies, credits, vouchers, and promotional vouchers in exchange for play of a game. At step 62, the player places a wager and initiates game play. At step 64, the gaming machine determines whether a triggering event has occurred. If there is no triggering event, the game ends at step 66. In the method shown in FIG. 7A, if a triggering event has occurred, the display content between one or more displays is automatically interchanged as shown at step 68. In the method shown in FIG. 7B, if a triggering event has occurred, a player button is activated thereby giving a player the option to interchange display content at step 70. At step 72, the gaming machine has received player input via the actuated player button, and the display content is interchanged between displays. In either method, at step 74, the display content reverts to the default display mode after the bonus, tournament, progressive, or secondary game has completed, or the player has inputted particular information (e.g., order a drink) into the gaming machine.

Figure 8:
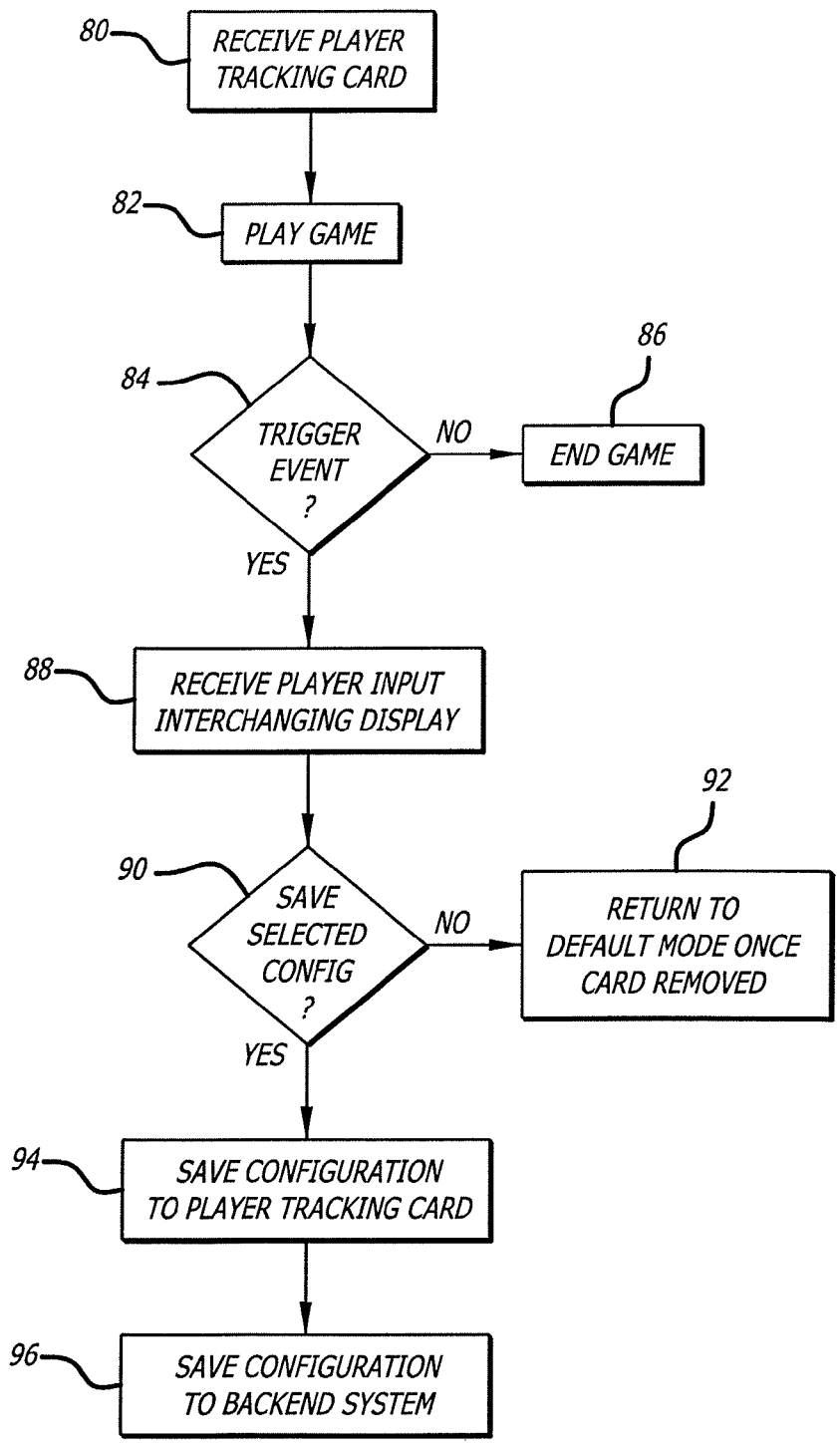
FIG. 8 is a flow diagram of yet another method for managing gaming machines having interchangeable displays.

FIG. 8 illustrates another method for managing gaming machines having interchangeable display content. At step 80, the player typically inserts a player tracking card into the gaming machine prior to initiating game play. The player tracking system typically acknowledges the player by name and presents the player status. At step 82, the player places a wager and initiates game play. At step 84, the gaming machine determines whether a triggering event has occurred. If a triggering event has not occurred, the game ends at step 86. If a triggering event has occurred, the player is given the option to interchange display content between one or more displays at step 88. Optionally, the player may also be given the option to further configure the interchange of displays (e.g., automatically swap displays in response to a particular trigger event). At step 90, the gaming machine presents the player with the option to save the player's configuration of the interchange of display content for future games or a gaming session on the same or different gaming machines. At step 92, the gaming machine returns to a default display configuration if the gaming machine does not receive player input saving the player's configuration. Alternately, the gaming machine returns to a default display configuration if the player removes the player card without saving the player's configuration. At steps 94 or 96, the gaming machine saves the player's selected configuration for interchanging display content. According to one method, the configuration is saved onto the player's tracking card. In another method, the configuration is saved and associated with the player's account on a backend system.

According to another method, a player reconfigures the display content on a first display, which presents two or disparate display content. For example, the first display may present a game on a large portion of the display and reserves a small area (e.g., window) on the first display for player tracking information, a secondary game, or a dashboard (e.g., display including information regarding remaining credits, credits bet per line, number of paylines being played, credits won, or the like). In this method, the player is able to swap the display content between the window and the main portion of the display. Alternatively, the display content is automatically swapped in response to a trigger event.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine, comprising:
   a first display that is reconfigurable to present a game content;
   a second display that is reconfigurable to present a secondary display content to a player, wherein the first and second displays are reconfigurable to swap the game content and the secondary display content at the same time in a single step; and
   a player input device configured to receive player input to swap the content displayed on the first display and the second display such that the first display presents the secondary display content and the second display presents the game content;
   wherein an option is provided to the player subsequent to initiation of game play to save content as swapped or return to a default mode where the first display presents the game content and the second display presents the secondary display content.

2. The gaming machine of claim 1, wherein the second display is positioned above the first display.

3. The gaming machine of claim 1, wherein the player input device is a mechanical button, electromechanical button, momentary contact button, toggle switch, rocker switch, rotary dial switch, or a virtual button.

4. The gaming machine of claim 3, wherein the virtual button is a touch-screen or touch-glass button that is located on the first display or the second display.

5. The gaming machine of claim 1, wherein the secondary display content is a secondary game, game options, non-gaming information, hospitality services, promotional information, concierge services, tournament game information, tournament game, progressive information, or a progressive game.

6. The gaming machine of claim 1, further comprising a player tracking interface in communication with the game processor, wherein the player tracking interface is configured to save player preferences for configuring the first display and the second display onto a player tracking card.

7. A gaming system including a gaming machine, the gaming system comprising:
   a first display that is reconfigurable to present a primary game on the gaming machine;
   a wireless receiver associated with the gaming machine configured to receive data transmitted from a wireless peripheral device having a display for presenting content, wherein display content of the first display of the gaming machine is swappable with the display content of the wireless peripheral device at the same time in a single step, enabling the first display of the gaming machine to present the display content of the wireless peripheral device and the display of the wireless peripheral device to present the display content of the first display of the gaming machine;
   a game processor in communication with the first display and the display content of the wireless peripheral device, wherein the game processor causes the first display to present the display content of the wireless peripheral device and the display of the wireless peripheral device to present the primary game in response to a trigger event based on player performance, a game outcome, a non-gaming transaction, or a game-generated response; and
   wherein an option is provided to the player subsequent to initiation of game play to save content as swapped or return to a default mode where the first display presents the primary game content and the second display presents the secondary display content.

8. The gaming system of claim 7, further comprising a player tracking interface in communication with the game processor, wherein the player tracking interface is configured to save player preferences for configuring the first display and the second display to a player tracking card.

9. The gaming system of claim 7, wherein the second display is positioned above the first display.

10. The gaming system of claim 7, wherein the player input device is a mechanical button, electromechanical button, momentary contact button, toggle switch, rocker switch, rotary dial switch, or a virtual button.

11. The gaming system of claim 10, wherein the virtual button is a touch-screen or touch-glass button that is located on the first display or the second display.

12. A method for altering display content on a gaming machine, the method comprising:
   providing a first display on the gaming machine that is reconfigurable to present a primary game;
   providing a second display on the gaming machine that is reconfigurable to present a secondary game; and
   automatically swapping display content on the first display with display content on the second display at the same time in a single step in response to a trigger event based on a game outcome of a game of chance, or a game-initiated response;
   wherein an option is provided to the player subsequent to initiation of game play to save content as swapped or return to a default mode where the first display presents the primary game content and the second display presents the secondary display content.

13. The method of claim 12, wherein the trigger event is a winning outcome of the game, tournament-triggering event, bonus-triggering event, system-generated message, or player input.

14. The method of claim 12, wherein the trigger event is based on time of play, frequency of play, number of maximum wagers, or a combination thereof.

15. The method of claim 12, wherein the display content on the second display is a secondary game, game options, non-gaming information, hospitality services, promotional information, concierge services, tournament game information, tournament game, progressive information, or a progressive game.

16. A method for altering display content on a gaming machine having a first display and a second display, the method comprising:
   initiating a game on the first display of the gaming machine;
   initiating secondary display content on the second display of the gaming machine;
   receiving player input to swap first display content on the first display with secondary display content on the second display;
   swapping secondary display content on the first display and first display content on the second display at the same time in a single step; and
   receiving data transmitted from a wireless peripheral device having a display for presenting content, wherein display content of the first or second display of the gaming machine is swappable with the display content of the wireless peripheral device;

wherein an option is provided to the player subsequent to initiation of game play to save content as swapped or return to a default mode where the first display presents the primary game content and the second display presents the secondary display content.

17. The method of claim 16, wherein the trigger event is a winning outcome of the game, tournament-triggering event, bonus-triggering event, system-generated message, or player input.

18. The method of claim 16, wherein the trigger event is based on time of play, frequency of play, number of maximum wagers, or a combination thereof.

19. The method of claim 16, wherein the display content on the second display is a secondary game, game options, non-gaming information, hospitality services, promotional information, concierge services, tournament game information, tournament game, progressive information, or a progressive game.

* * * * *